Patented Mar. 14, 1950

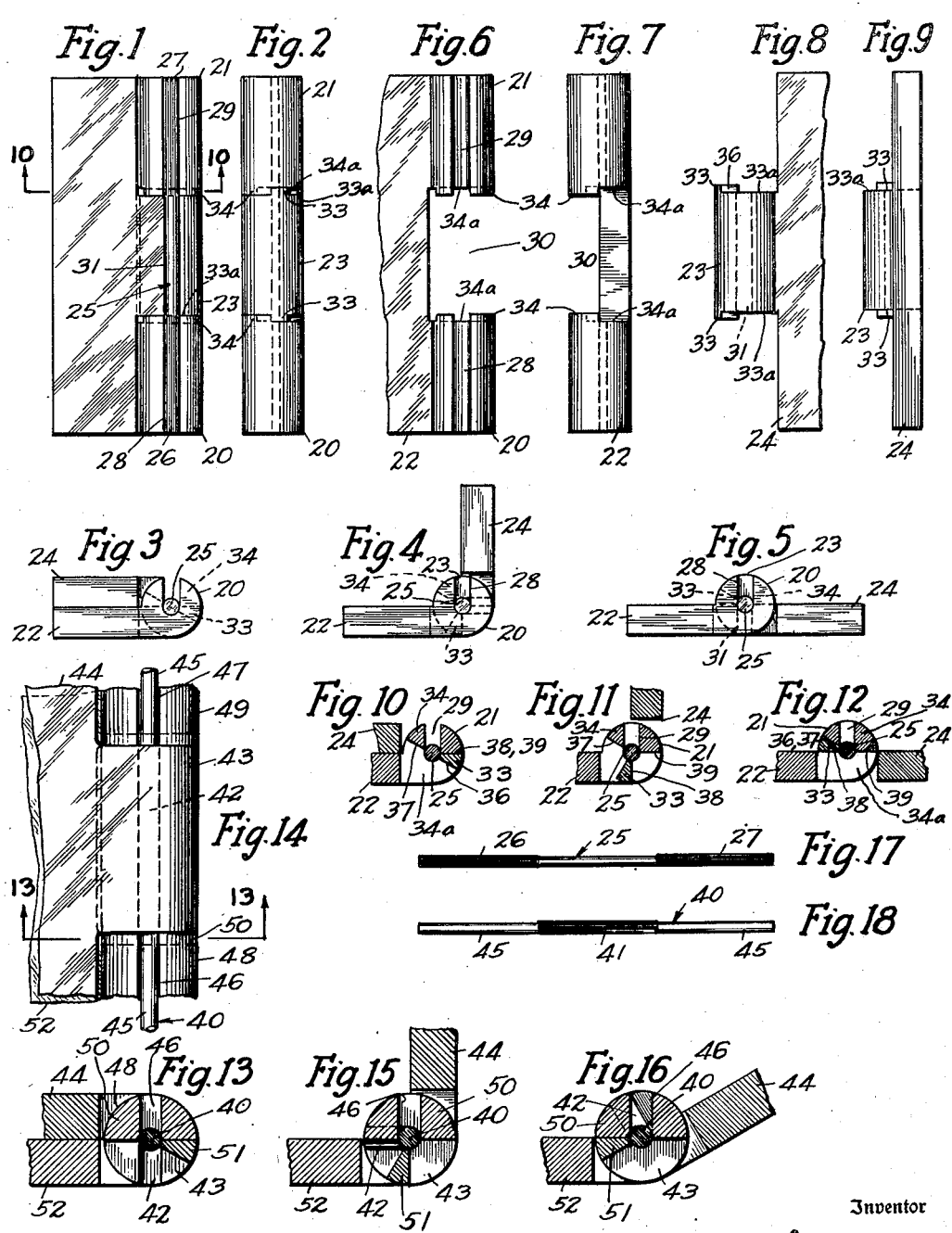

2,500,829

UNITED STATES PATENT OFFICE 2,500,829

MOLDABLE PLASTIC HINGE

Harry Jacobson, New York, N. Y., assignor to Victor Metal Products Corporation, Brooklyn, N. Y., a corporation of New York Application February 15, 1947, Serial No. 728,825

8 Claims. (Cl. 16—191)

This invention relates to molded hinges and particularly to the slotted type designed to be molded integrally with the parts of a box or the parts of any other hinged and molded article.

It has been proposed to mold slots instead of holes in the barrels of such molded hinges and to insert a hinge pin into the slots. While such molded slots obviate the prohibitively expensive step of molding or drilling holes for the hinge pin, hinges employing such slots have not been adopted commercially, possibly because of the difficulty and unwarranted expense involved in providing means for holding the hinge members and the pin together against separation, while permitting rotation of one of the hinge members relatively to the other and to the pin.

The present invention therefore contemplates the provision of simple and inexpensive means readily moldable as an integral part of each of the hinge members for normally preventing separation of the hinge members in certain positions wherein the members would otherwise be separable, while permitting the hinge to operate in the usual manner.

The invention further contemplates the provision of integrally molded projections preferably in the form of segments of selected areas on the respective adjacent end surfaces of the molded and slotted hinge members, the projections being arranged to cooperate with each other by the engagement of adjacent edges thereof to limit the extent of the relative rotation of the hinge members and also to prevent the hinge from coming apart after the hinge has been assembled and the hinge pin fixed in place.

The various objects of the invention will be clear from the description which follows and from the drawings, in which Fig. 1 is an elevational view of a hinge embodying the invention and showing the hinge closed.

Fig. 2 is a side elevational view of Fig. 2.

Fig. 3 is an end elevational view of Fig. 1.

Fig. 4 is a similar view of the hinge in a half way open position.

Fig. 5 is a similar view of the hinge in the position thereof in which it is open to the fullest extent permitted by the stops or segments thereof.

Fig. 6 is a fragmentary elevational view similar to Fig. 1 of one of the hinge members as it appears before it has been secured to the other hinge member.

Fig. 7 is a side elevational view of Fig. 6.

Fig. 8 is an elevational view of the other hinge member in the position thereof shown in Fig. 5.

Fig. 9 is a side elevational view of Fig. 8.

Fig. 10 is a fragmentary horizontal sectional view of the closed hinge taken on the line 10—10 of Fig. 1.

Figs. 11 and 12 are similar views of the hinge showing the positions of the hinge parts corresponding respectively to the positions shown in Figs. 4 and 5.

Fig. 13 is a similar sectional view taken on the line 13—13 of Fig. 14.

Fig. 14 is a fragmentary elevational view of a slightly modified form of the hinge in its closed position, and wherein the hinge pin is fixed in the slot of the central hinge barrel and the slots of the respective hinge members extend in opposite directions when the hinge is closed.

Figs. 15 and 16 are sectional views similar to Fig. 13 but showing the hinge half way open and completely open respectively.

Fig. 17 is an elevational view of the hinge pin employed in the hinge of Fig. 1.

Fig. 18 is an elevational view of the hinge pin employed in the hinge of Fig. 14.

In the practical embodiment of the invention shown by way of example, the hinge has been illustrated for simplicity as a structure separate from any article of which it may form a part. In other words, the plate portions of the hinge members have been shown as flat and of rectangular outline. It is to be understood however, that the plate portions so shown may be in fact of any suitable shape and size and may form the parts of a molded box or other hinged molded article having at least two parts.

In the form of the hinge shown in Figs. 1 to 12, the cylindrical portions or barrels 20 and 21 of the hinge member 22 are spaced apart sufficiently to receive between them the barrel 23 of the other hinge member 24 as is usual in hinges. Each of the barrels has molded therein a radial slot of the proper width and shape to receive a suitable hinge pin as 25. To secure the pin in the barrels 20 and 21, the outer portions as 26, 27 of the pin may be grooved, corrugated or serrated to form longitudinal cutting portions designed to cut into the plastic material (such as synthetic resin) of the sides of the slots when the pin is forced longitudinally into place to arrange the pin parts 26, 27 in the respective slots 28, 29.

The pin is not inserted into the slots until after the hinge members 22 and 24 have been assembled in their operative relation, with the barrel 23 in the space 30 between and in alignment with the barrels 20 and 21. In the closed position of the hinge members shown in Figs. 1 and 3, the slot 31 in the barrel 23 is aligned with the slots 28 and 29. When the pin 25 is forced into the bottom portions of the aligned slots, the pin is fixed as hereinbefore described in the slots 28 and 29 and may rotate in the slot 31 which receives the smooth middle portion of the hinge pin. By fixing the pin to the member 22, the pin cannot become displaced. However, if no provision is made to prevent the member 24 from becoming separated from the pin, such separation can occur in the open position of the hinge shown in Fig. 5. In that position, the slots 28 and 29 extend vertically upwards from the pin and the slot 31 extends vertically downwards. Hence the barrel 23 rests on the pin merely of its own weight and might be lifted off the pin accidentally or deliberately thereby to separate the hinge members, or to separate the hinged parts of the article of which said members form portions. It will also be noted that the hinge may be opened past the position shown in Fig. 5 and the parts separated if no provision were made to prevent such opening and separation.

However, means are provided for limiting the extent of the opening movement of the hinge and also for preventing separation of the member 24 from the pin 25 and from the member 22. Said means takes the form of a segmental end projection 33 extending axially from and beyond a selected area of each end surface of the barrel 23 and a larger segmental projection 34 similarly extending axially from a selected non-corresponding area of the inner end surface of each of the barrels 20 and 21. To permit opening of the hinge through an angle of 180° and as best seen in Figs. 10 to 12, the segments 33 and 34 each subtend an angle of less than 180°, but the edge 36 of the segment 33 is arranged to engage the inclined edge 37 of the segment 34, to be stopped thereby when the hinge is open to the desired limit. Similarly, when the hinge is closed, the edge 38 of the segment 33 may optionally engage the horizontal edge 39 of the segment 34.

The segment 33 operates in the space or recess below the segment 34 and inwardly of the end surface 34a of the barrel 20 or 21. Similarly, the segment 34 is arranged at all times in the recess or space just outwardly of the end surface 33a of the barrel 23. Each of the segments is of about the same thickness, that is, they each extend the same amount axially of the barrel, so that the corresponding segments 33 and 34 on adjacent end surfaces 33a and 34a are arranged in overlapping relation to each other. In the positions of Figs. 5 and 12, the segment 33 of the member 24 engages and is stopped by the segment 34, thereby preventing the member 24 from being lifted off the hinge pin to which it is not secured, as might be done if the cooperating end segments were not provided.

Obviously, the sizes of the segments, the relative positions thereof and of the slots in the closed and open positions of the hinge, the shapes of the edges of the barrel-receiving cut-outs in the hinge members, the extent of movement of the hinge parts and the sizes and shapes of the barrels in which the hinge pin is inserted may be changed according to the particular requirements of the article of which the hinge forms part. For example, in Figs. 13 to 16, the hinge pin 40 is provided with a slightly enlarged middle serrated or cutting portion 41 fixed in the slot 42 of the barrel 43 projecting from the hinge member 44, said slot being open at the bottom in the closed position of the hinge. The end reduced parts 45 of the pin are relatively loose in the slots 46, 47 of the barrels 48, 49 of the hinge member 52, said slots facing in the direction opposite to that of the slot 42 when the hinge is closed, that is, being open at the top (Figs. 13 and 14). Under these conditions the hinge members may ordinarily be separated when in the closed position. However, the end projections in the form of segments 50 and 51 on the members 52 and 44 respectively prevent such separation. One segment 51 extends from any desired part of the area of each end surface of the barrel 43 similarly to the segment 33 hereinbefore described, and may be similarly shaped. The segment 50 is shown as semi-circular to limit the opening movement of the hinge to less than 180° as shown in Fig. 16, and by its engagement with the segment 51 as shown in Figs. 13 and 14 prevents separation of the hinge members in the closed position of the hinge.

In the partly open position of the hinge shown in Fig. 15, the segment 51 prevents disengagement of the hinge members, being in the path of the segment 50 on attempted detaching movement of the member 52 from the hinge pin. Obviously, the area of the segment 51 may be increased and that of the segment 50 correspondingly decreased to insure against disengagement of the hinge members from the hinge pin in all possible positions of the members, such changes in the areas of the segments being possible without changing the extent of the opening movement of the hinge.

Preferably, though not necessarily, the sides of the slots for the hinge pin are made perpendicular to the plane of the faces of the respective hinge members to permit the slots to be molded relatively inexpensively, the slots extending to the outer cylindrical surfaces of the respective barrels. The positions and areas of the integrally molded segments may also be considerably varied while maintaining their functions of preventing separation of the hinge members and determining the limiting open positions of the hinge members.

It will be seen that I have provided an efficient, non-separable, moldable hinge requiring only the insertion of a hinge pin thereinto and no other operations to hold the parts together, the hinge being well adapted to meet the severe low cost and other requirements of practical use. Various changes may be made in the specific forms of the invention herein shown and described without departing from the spirit thereof as defined in the appended claims.

I claim:

1. A plastic moldable hinge comprising a pair of moldable hinge members each provided with a barrel, the barrel of one member being in alignment with and adjacent the barrel of the other member, each of the barrels having a moldable longitudinal slot therein extending inwardly past the axis of the barrel, a hinge pin fixed in the slot of one of the barrels and entering the slot of the other barrel, and a segment integral with and projecting from a selected area of each of the adjacent end surfaces of the barrels and serving to prevent separation of the hinge members, the segments of adjacent barrels being arranged respectively at non-corresponding parts of the end surfaces of the respective barrels.

2. A hinge according to claim 1 in which the segments are of the same thickness and project axially of the barrels the same amount.

3. A hinge according to claim 1 in which the slots extend in substantially the same direction when the hinge members are closed upon each other.

4. A hinge according to claim 1 in which the slots extend in substantially opposite directions when the hinge members are closed upon each other.

5. A hinge according to claim 1 in which when the hinge members are horizontal, the segment of the lower hinge member is arranged above the segment of the upper hinge member.

6. A hinge according to claim 5 in which the slots extend in substantially the same direction when the hinge members are closed upon each other.

7. A hinge according to claim 5 in which the slots extend in substantially opposite directions when the hinge members are closed upon each other.

8. A plastic moldable hinge comprising a pair of moldable hinge members each provided with a barrel, each of the barrels having a moldable longitudinal slot therein extending inwardly past the axis of the barrel, a hinge pin arranged in the slots of the barrels, and a segment projecting from a selected area of each of the adjacent end surfaces of the barrels and serving to prevent separation of the hinge members, the segments of adjacent barrels being arranged respectively at non-corresponding parts of the end surfaces of the respective barrels.

HARRY JACOBSON.

REFERENCES CITED

The following references are of record in the file of this patent:

UNITED STATES PATENTS

| Number | Name | Date |
|--------|------|------|
| 414,905 | Helbing | Nov. 12, 1889 |
| 1,900,643 | Gessler | Mar. 7, 1933 |